(12) United States Patent
King et al.

(10) Patent No.: US 9,856,988 B2
(45) Date of Patent: Jan. 2, 2018

(54) CHOKE TRIM ASSEMBLY

(75) Inventors: Keith James King, Owenton, KY (US); Steven J. Perrmann, Kirkwood, MO (US); Emily Ferguson, Cincinnati, OH (US)

(73) Assignee: M-I L.L.C., Houston, TX (US)

( * ) Notice: Subject to any disclaimer, the term of this patent is extended or adjusted under 35 U.S.C. 154(b) by 804 days.

(21) Appl. No.: 12/990,976

(22) PCT Filed: May 8, 2009
(Under 37 CFR 1.47)

(86) PCT No.: PCT/US2009/043216
§ 371 (c)(1),
(2), (4) Date: Feb. 1, 2011

(87) PCT Pub. No.: WO2009/137729
PCT Pub. Date: Nov. 12, 2009

(65) Prior Publication Data
US 2012/0181470 A1 Jul. 19, 2012

Related U.S. Application Data

(60) Provisional application No. 61/051,494, filed on May 8, 2008.

(51) Int. Cl.
*F16K 1/42* (2006.01)
*F16K 25/00* (2006.01)
(Continued)

(52) U.S. Cl.
CPC ............ *F16K 25/00* (2013.01); *E21B 21/106* (2013.01); *E21B 34/02* (2013.01); *F16K 1/42* (2013.01);
(Continued)

(58) Field of Classification Search
USPC ........ 137/315.11, 315.27, 375, 454.2, 454.6; 251/356, 359, 360, 363, 365, 315.14;
(Continued)

(56) References Cited

U.S. PATENT DOCUMENTS

| 434,808 A | * | 8/1890 | Richmond | ............... F16J 15/28 |
| | | | | 277/533 |
| 967,235 A | * | 8/1910 | Ramberg | ................. F16J 15/28 |
| | | | | 277/520 |

(Continued)

FOREIGN PATENT DOCUMENTS

| CN | 1701194 A | 11/2005 |
| CN | 101054924 A | 10/2007 |

OTHER PUBLICATIONS

ANSI Standard Limits and Fits (ANSI B4.1-1967,R1974). Datasheet [online]. Coban Engineering, 2013 [retrieved on Nov. 26, 2014]. Retrieved from the Internet: <URL: www.cobanengineering.com/Tolerances/ANSILimitsAndFits.asp>.*

(Continued)

*Primary Examiner* — Michael R Reid
*Assistant Examiner* — Jonathan Waddy
(74) *Attorney, Agent, or Firm* — David J. Smith

(57) ABSTRACT

A choke trim assembly for use as a shuttle seat in a choke valve including a flange sleeve is disclosed, the choke trim assembly comprising a trim, a trim carrier, and a clamp ring, wherein the trim carrier and the clamp ring each have a tubular member, an outer diameter of the tubular member of the clamp ring being configured to enable a slip fit of the choke trim assembly into an inner diameter of the flange sleeve, the trim being centered in the clamp ring, and an outer diameter of the tubular member of the trim carrier and the inner diameter of the clamp ring being configured to enable a slip fit of the trim carrier into the clamp ring.

12 Claims, 5 Drawing Sheets

(51) Int. Cl.
*E21B 21/10* (2006.01)
*E21B 34/02* (2006.01)

(52) U.S. Cl.
CPC ....... *F16K 25/005* (2013.01); *Y10T 137/0491* (2015.04)

(58) Field of Classification Search
USPC .......................................................... 277/533
See application file for complete search history.

(56) References Cited

U.S. PATENT DOCUMENTS

| | | | | |
|---|---|---|---|---|
| 1,044,787 | A * | 11/1912 | Klingloff | F16J 15/28 277/533 |
| 1,050,870 | A * | 1/1913 | Stickley | F16J 15/28 277/533 |
| 2,665,879 | A * | 1/1954 | Housekeeper et al. | 251/95 |
| 2,792,845 | A * | 5/1957 | Atherton et al. | 137/375 |
| 2,963,038 | A * | 12/1960 | Sharp | F16K 43/00 137/454.6 |
| 3,033,227 | A * | 5/1962 | Goldman | 137/328 |
| 3,323,542 | A * | 6/1967 | Magos et al. | 137/315.19 |
| 3,559,531 | A * | 2/1971 | Leibfritz | F15B 15/223 137/454.5 |
| 4,302,020 | A * | 11/1981 | Morales | F16J 15/28 277/530 |
| 4,474,208 | A * | 10/1984 | Looney | F16K 17/0406 137/516.29 |
| 4,518,148 | A * | 5/1985 | Renfro | 251/122 |
| 4,523,608 | A * | 6/1985 | Miller | 137/315.19 |
| 4,763,876 | A * | 8/1988 | Oda et al. | 251/359 |
| 4,932,432 | A * | 6/1990 | Berchem | 137/375 |
| 5,353,832 | A * | 10/1994 | Berchem | 137/375 |
| 6,752,377 | B1 * | 6/2004 | Taylor et al. | 251/363 |
| 6,782,949 | B2 | 8/2004 | Cove et al. | |
| 7,093,819 | B1 * | 8/2006 | Hall et al. | 251/214 |
| 2003/0098151 | A1 | 5/2003 | Cove et al. | |
| 2004/0091352 | A1 * | 5/2004 | Gay | F04D 1/063 415/104 |
| 2005/0115619 | A1 | 6/2005 | Kawulka et al. | |
| 2006/0011877 | A1 | 1/2006 | Suter et al. | |
| 2007/0017586 | A1 | 1/2007 | Bohaychuk | |
| 2008/0060704 | A1 * | 3/2008 | McCarty | F16K 25/005 137/375 |

OTHER PUBLICATIONS

Coefficients of Thermal Expansion Chart. Datasheet [online]. Lucas Milhaupt, 2011 [retrieved on Apr. 28, 2017]. Retrieved from the internet: <URL: www.lucasmilhaupt.com/en-US/brazingfundamentals/coefficientsofthermalexpansionchart/>.*
Office Action Issued in Egyptian Application No. 1891/2010 (3 Pages With English Correspondence).
Office Action Issued in Canadian Application No. 2,723,422, dated Oct. 1, 2012 (3 Pages).
International Search Report issued in PCT/US2009/043216, dated Dec. 24, 2009, 4 pages.
Written Opinion issued in PCT/US2009/043216, dated Dec. 24, 2009, 4 pages.
Office Action Issued in Chinese Application No. 200980116309.4, dated Nov. 20, 2012 (10 Pages with English Translation).
Notice of Allowance w/translation issued in corresponding Mexican Application No. MX/a/2010/012059, dated Aug. 23, 2013 (4 pages).
Examination Report issued in corresponding Indonesian Application No. W-00201004206; dated Jul. 12, 2012 (3 pages).
Office Action in corresponding Canadian Application No. 2723422 dated Jul. 30, 2013 (5 pages).
Office Action issued in counterpart Canadian application No. 2723422 dated May 2, 2014 (4 pages).

* cited by examiner

CHOKE TRIM ASSEMBLY

BACKGROUND OF DISCLOSURE

Field of the Disclosure

Embodiments disclosed herein relate generally to a choke trim for a choke valve used for controlling the flow of fluids.

Background Art

Choke valves are used to control the flow rate and the pressure of fluids flowing through a flow line in hydrocarbon wells. When a well is being drilled and stimulated, gases and drilling fluids under high pressure flow through the choke valve. The gases and drilling fluids may be at high pressures and may carry abrasive particles such as drill cuttings, sand, silt, drilling fluid additives, and other debris.

To protect the interior of the choke valve, choke valves generally include one or several inserts such as a trim. The trim is a replaceable component that is used to line the interior of the housing of the choke valve. It is made of an erosion-resistant material, such as tungsten carbide. Furthermore, the trim may serve as a valve seat. Referring to FIG. 1, an example of a prior art choke valve 1 is shown. The choke valve 1 includes a choke housing 3, a bonnet 21, a shuttle assembly 19 including a mandrel 17 and a shuttle 15 slidably mounted over the mandrel 17, a trim 9 having a flanged design and serving as a seat for the shuttle 15, a flange sleeve 13, and downstream trim components, such as a wear sleeve 11. The choke housing 3 includes an inlet channel 5, an outlet channel 7, and a choke orifice 27. The trim 9 is kept in place by an o-ring 29 sealing the trim 9 to the housing 3.

In the choke valve illustrated in FIG. 1, the flange sleeve 13 and the shuttle assembly 19 are aligned within the choke valve 1 with respect to an inner wall 28 of choke orifice 27, and the trim 9 is aligned with an inner wall 10 of the outlet channel 7. Consequently, if the choke orifice 27 and the outlet channel 7 were misaligned during manufacture of the housing 3, there would be misalignment of the shuttle assembly 19 and the trim 9. Since the trim 9 serves as a shuttle seat, mechanical pressure is exerted on the trim 9 by the shuttle 15 repeatedly. Misalignment could even lead to breakage of the trim 9. Furthermore, the distance between the o-ring 29 and the first end 37 of the trim 9 is relatively long so that mud and other materials may gather between the trim 9 and the choke housing 3. This may also result in misalignment of the trim 9 and may make it difficult to remove trim 9 for replacement as accumulated particles may wedge trim 9 in place.

In addition, to allow for manufacturing tolerances, a gap of up to 0.03 inches may exist between the inner diameter of the flange sleeve 13 and a first end 37 of the trim 9. Thus, the flange sleeve 13 does not retain the trim 9; rather, o-ring 29 is used to retain trim 9 with respect to housing 3. Due to this gap between the trim 9 and the flange sleeve 13, the trim 9 can move with respect to the flange sleeve 13, resulting in a loss of concentricity between the shuttle 15 and the trim 9.

In addition, the manufacture of the trim 9, being of an erosion-resistant material, such as tungsten carbide or hardened steel, is a difficult task due to its flanged design and the changing cross-sectional area of trim 9 throughout its length.

Thus, it would be an improvement to the art to have a trim with a simplified design and increased performance due to an improved fit of the trim within the choke valve.

SUMMARY OF THE CLAIMED EMBODIMENTS

Embodiments disclosed herein relate to a choke trim assembly for use in a choke valve, whereby the choke trim assembly enables an improved mechanical resistance and fit, and the trim has a simpler design.

In a first aspect, embodiments disclosed herein relate to a choke trim assembly for use as a shuttle seat in a choke valve including a shuttle assembly and a flange sleeve to receive the shuttle assembly. The choke trim assembly includes a trim, a trim carrier, and a clamp ring, wherein the trim and the trim carrier are adapted to be assembled within the clamp ring such that the trim is centered in the clamp ring and the clamp ring is adapted to enable a slip fit of the trim carrier into the clamp ring.

In a second aspect, embodiments disclosed herein relate to a choke valve including a choke housing, a shuttle assembly, a flange sleeve to receive the shuttle assembly, and the choke trim assembly for use as a shuttle seat.

In a third aspect, embodiments disclosed herein relate to a method of assembling a choke valve with a choke trim assembly. The method includes: inserting downstream trim components into an outlet channel of a choke housing; inserting a wear sleeve into the outlet channel of the choke housing so that the wear sleeve rests against the downstream trim components; inserting a trim assembly comprising a trim, a trim carrier, and a clamp ring into a choke orifice of the choke housing so that the trim carrier rests on a shoulder between the choke orifice and the outlet channel; inserting a flange sleeve having an opening in a side thereof into the choke orifice, thereby aligning the opening of the flange sleeve with an inlet channel of the choke housing and pushing the trim assembly against the wear sleeve; and inserting a shuttle assembly into the flange sleeve.

Other aspects, characteristics, and advantages will be apparent from the following detailed description and the appended claims.

DETAILED DESCRIPTION

Figure 1:
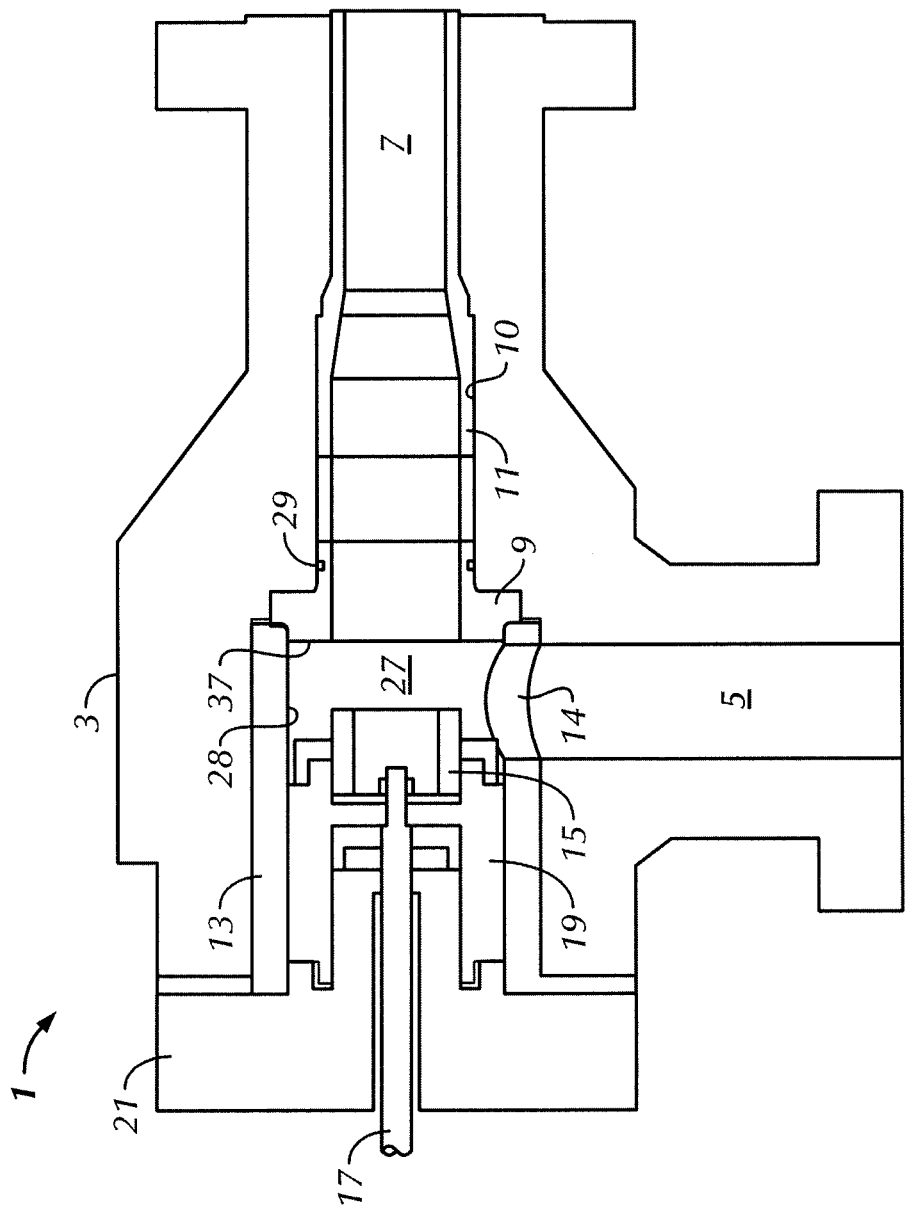
FIG. 1 is a schematic cross-sectional view of a prior art choke valve.

Embodiments disclosed herein relate to a trim assembly for a choke valve. More specifically, embodiments disclosed herein relate to a trim assembly having a simplified design that may improve alignment of the trim and the shuttle, and may make removal and replacement of the trim easier. Embodiments of the trim assembly may also have a more consistent cross-sectional area, which may improve fabrication and reduce trim manufacturing costs.

Specific embodiments of the trim assembly disclosed herein and how the trim is used in a choke valve will now be described in detail with reference to the accompanying figures. Like elements in the various figures may be denoted by like reference numerals for consistency.

Figure 2A:
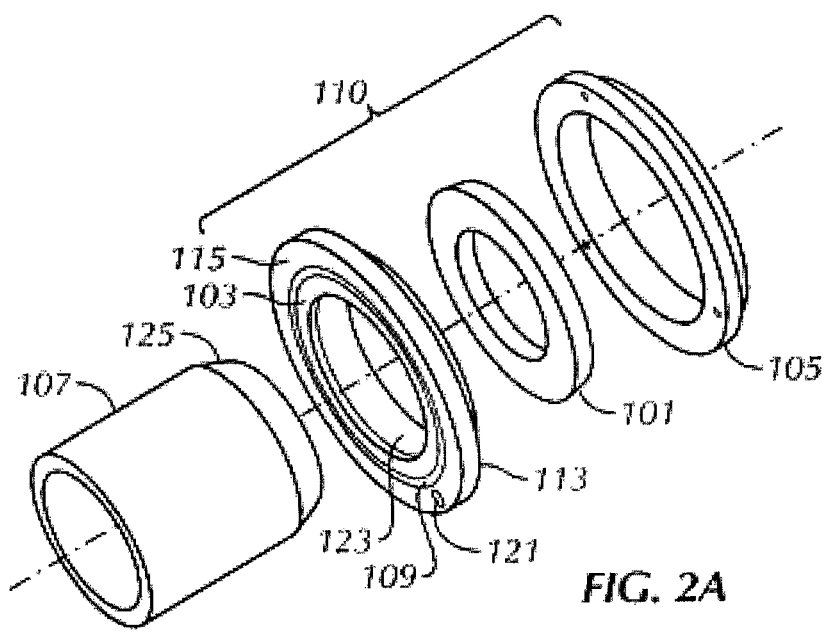
FIG. 2a shows a partial three-dimensional extended view of the choke trim assembly and a wear sleeve according to embodiments disclosed herein.
Figure 2B:
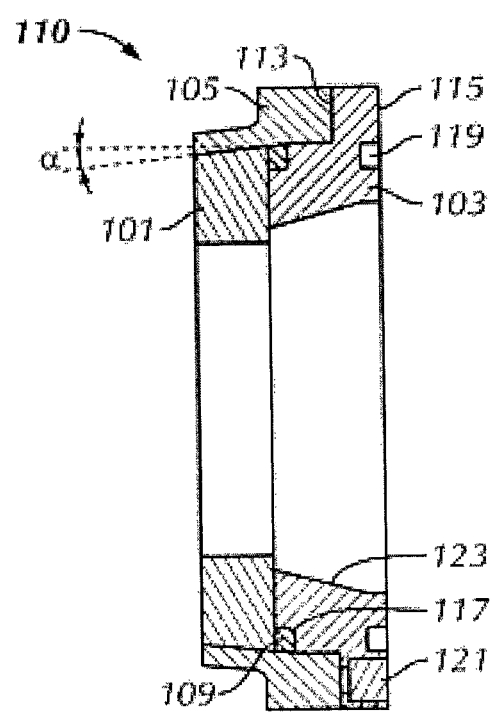
FIG. 2b shows a cross-sectional view of the choke trim assembly according to embodiments disclosed herein.
Figure 3:
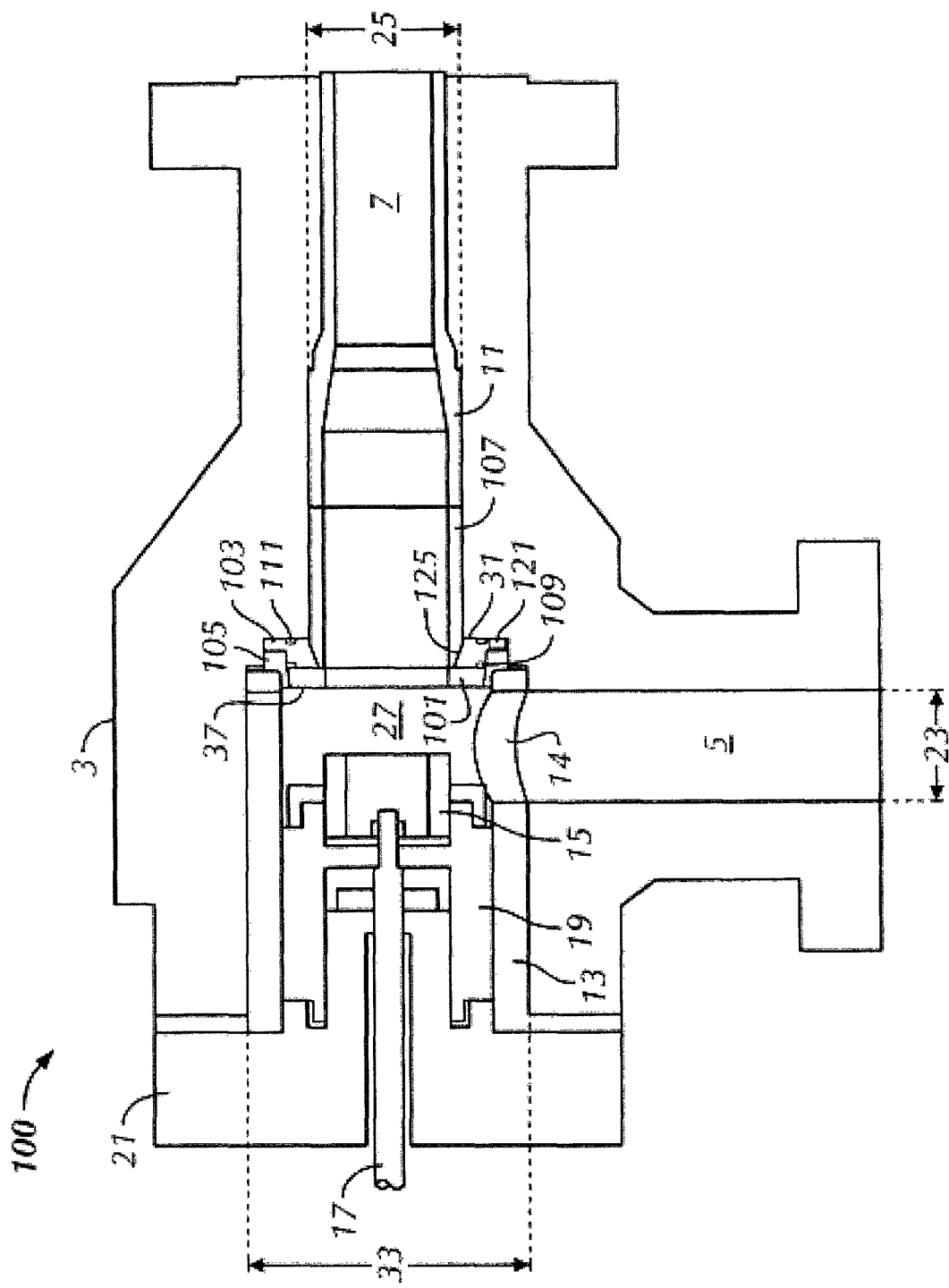
FIG. 3 is a schematic cross-sectional view of a choke valve comprising a choke trim assembly according to embodiments disclosed herein.

In a first aspect, embodiments disclosed herein relate to a choke trim assembly for use in a choke valve. Referring to FIG. 2b, the choke trim assembly 110 according to embodiments disclosed herein is shown in a cross-sectional view. The choke trim assembly 110 may be a three-component assembly including a trim 101, a trim carrier 103, and a clamp ring 105. The clamp ring 105 and the trim carrier 103 each have a tubular member and a flange. The flange of the trim carrier 103 has a first annular surface 113 facing the clamp ring 105 and a second annular surface 115 facing a shoulder 31 (as shown in FIG. 3) of the choke housing 3 (as shown in FIG. 3). When assembled, the tubular member of the trim carrier 103 fits into the inner diameter of the clamp ring 105.

In an embodiment as shown in FIG. 2b, the choke trim assembly 110 further includes an o-ring 109 forming a seal between the components of the choke trim assembly 110. To this end, a first circumferential groove 117 is provided on the first annular surface 113 of the trim carrier 103. The o-ring 109 is adapted to be seated in the first circumferential groove 117. Compression of o-ring 109 and surface-to-surface seating of components 103, 105, 101 may thus allow the trim assembly 110 to act as a single piece once assembled.

The trim 101 of the trim assembly 110 according to the embodiment as shown in FIG. 2b is donut shaped. Such a simple shape is made possible by the three-component trim assembly 110. As the skilled person will appreciate, other shapes of the trim 101 may be realized.

The outer diameter of the trim 101 may vary along the length of the trim 101 so that the trim 101 has a tapered outer diameter. The tapered outer diameter for the trim 101 may provide clamping and centering forces when the components of the trim assembly 110 are assembled. In some embodiments, the outer diameter of trim 101 may have a taper angle $\alpha$ in the range from about 5° to about 15°; from about 7° to about 13° in other embodiments; from about 9° to about 11° in other embodiments; and about 10° in yet other embodiments. The clamp ring 105 has a tapered inner diameter similar to the tapered outer diameter of the trim 101, thus enabling the trim 101 to be clamped and centered within the clamp ring 105 during assembly. The person skilled in the art will appreciate that other taper angles may be used for the outer diameter of the trim 101 and the inner diameter of the clamp ring 105, without departing from a design having few sections with a changing cross-sectional area of the clamp ring 105. As shown in FIG. 2a, the trim carrier 103 receives the clamp ring 105 and the trim 101 centered within the clamp ring 105. The trim carrier 103 has a tapered counter bore 123.

In some embodiments, trim assembly 110 components 101, 103, 105 may be pre-assembled, including pre-assembling the o-ring 109 to the components. Thus, trim assembly 110 may be inserted into a choke valve as a single piece during assembly of the valve or during replacement of valve components.

FIG. 2a further shows a wear sleeve 107 adapted to be assembled with the choke trim assembly 110 when inserting the wear sleeve 107 and the choke trim assembly 110 into a choke valve. The wear sleeve 107 has a tapered outer diameter section 125 at a first end corresponding to a tapered counter bore 123 of the trim carrier 103.

The trim 101 is advantageously made of tungsten carbide, or any other abrasion resistant material known in the art, such as nickel impregnated carbide. The trim carrier 103 and the clamp ring 105 are advantageously made of stainless steel, or any other fracture resistant material known in the art. The trim carrier 103 and the clamp ring 105 may also be made of a material that is corrosion and fracture resistant according to application-specific requirements. Wear sleeve 107 may also be manufactured from abrasion resistant materials. The combination of wear resistant materials and fracture resistant materials in the trim assembly may provide for erosion resistance, and may also result in a trim assembly having an improved fracture resistance as compared to prior art trims formed completely from erosion resistant materials.

In a second aspect, embodiments disclosed herein relate to a choke valve having a choke trim assembly according to the first aspect as described above.

In FIG. 3, a schematic view of a choke valve 100 similar to that of the prior art (FIG. 1) is shown, the choke valve 100 including a choke trim assembly in accordance with the embodiment as shown in FIG. 2b. The outlet channel 7 has an outlet channel diameter 25 that may vary along its length. The choke orifice 27 has an orifice diameter 33 that is larger than the outlet channel diameter 25, thus forming a shoulder 31 at the junction of the two bores. The trim assembly is associated the flange sleeve 13 through a close slip fit of the outer diameter of the tubular member of the clamp ring 105 to the inner diameter of the flange sleeve 13.

Referring to FIGS. 2b and 3, embodiments of the choke valve include a second o-ring 111 to seal between the choke trim assembly and the choke housing 3. To this end, a second circumferential groove 119 is provided on the second annular surface 115 of the flange of the trim carrier 103. The second o-ring 111 is adapted to be seated in the second circumferential groove 119. O-ring 111 may be compressed, forming a seal between the trim carrier 103 and the shoulder 31 of the choke housing 3.

In the embodiment as shown in FIG. 3, the wear sleeve 107 fits into the counter bore 123 of the trim carrier 103 due to the tapered outer diameter section 125 of the wear sleeve 107. In some embodiments, the inner diameter of the wear sleeve 107 may be larger then the inner diameter of the trim 101. For example, the inner diameter of wear sleeve 107 may be about 0.8 mm (about 0.03") larger then the inner diameter of trim 101 in some embodiments, which may vary depending upon the size of the valve. The wear sleeve 107 is advantageously made of tungsten carbide as the trim 101, or any other abrasion resistant material known in the art.

In a third aspect, the invention relates to a method of assembling a choke valve comprising a trim assembly according to embodiments of the invention. Returning to FIGS. 2b and 3, downstream trim components 11 are inserted into the housing 3 through the choke orifice 27 and seated within the outlet channel 7. Then, the wear sleeve 107 is inserted through the choke orifice 27 so that it rests against the downstream trim components 11.

As mentioned above, the trim 101, the trim carrier 103, the clamp ring 105, and the o-ring 109 may be pre-assembled, thus providing the trim assembly 110. First, the trim 101 is inserted into the clamp ring 105. Then, a fine threaded screw 121 may be used to fix the trim carrier 103 to the clamp ring 105, thereby wedge-locking the trim 101 to the clamp ring 105. The person skilled in the art will appreciate that for the pre-assembling, any type of screw providing the pull-up force needed to compress the o-ring 109 and provide the seal may be used. The trim assembly 110 and the second o-ring 111 are then inserted through the choke orifice 27 so that the flange of the trim carrier 103 rests against the shoulder 31 of the choke housing 3, thereby sealing the trim assembly 110 to the shoulder 31 using the second o-ring 111. The flange sleeve 13 is inserted into the choke orifice 27 and oriented such that the sleeve opening 14 is aligned with the inlet channel 5. Thus, the trim assembly 110 is pushed against the wear sleeve 107 so that the tapered counter bore 123 of the trim carrier 103 receives the tapered outer diameter section 125 of the wear sleeve 107. The shuttle assembly 19 is assembled to the bonnet 21. The bonnet 21 is then placed over the housing 3 such that the shuttle 15 of the shuttle assembly 19 is lowered into the flange sleeve 13. Finally, the bonnet 21 is fixed to the housing 3.

Those skilled in the art will appreciate that the choke valve may be assembled without pre-assembling the trim assembly 110. Thus, the above procedure for assembling the valve would be adjusted to account for the placement of the individual components of the trim assembly, rather than a pre-assembled trim assembly, within the housing.

While assembling the choke valve, the trim assembly and the flange sleeve are aligned based on the flange sleeve pushing the trim assembly against the wear sleeve. The trim assembly components are thereby compressed and centered based on the tapers and the small tolerance stacks.

Figure 4A:
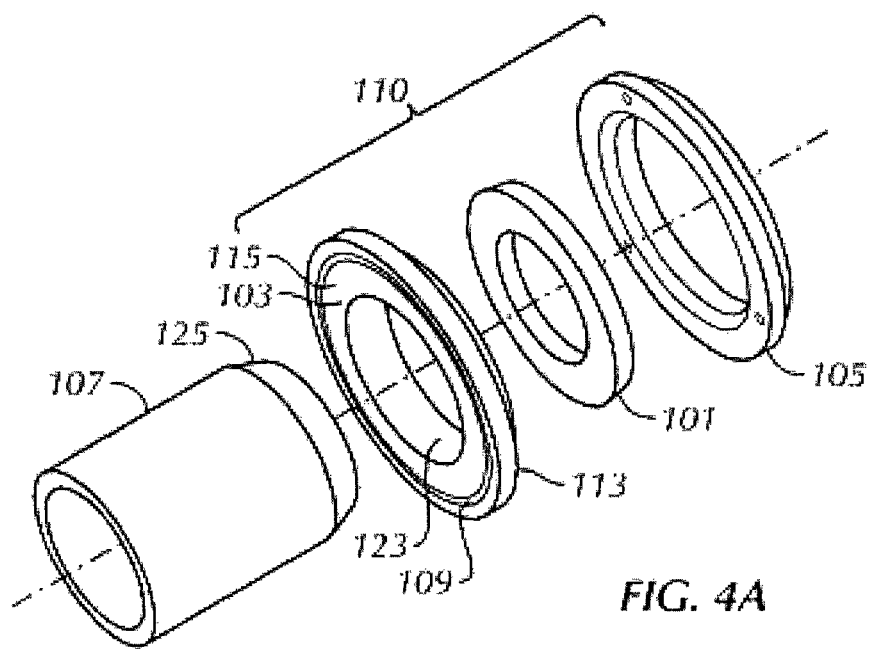
FIG. 4a shows a partial three-dimensional extended view of the choke trim assembly and a wear sleeve according to embodiments disclosed herein.
Figure 4B:
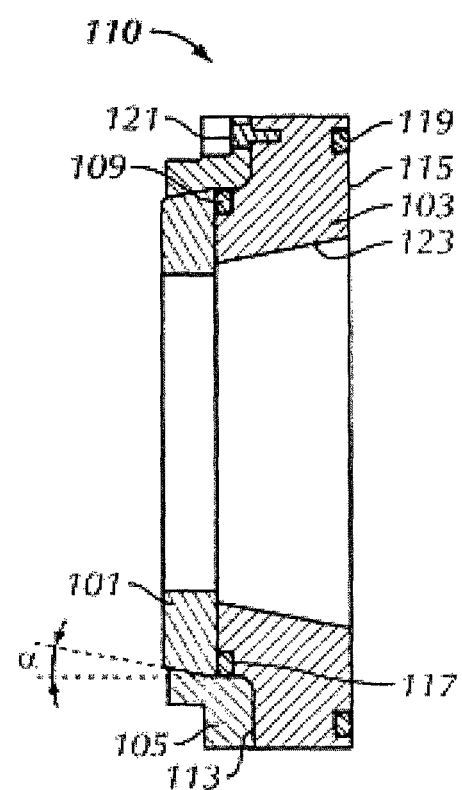
FIG. 4b shows a cross-sectional view of the choke trim assembly according to embodiments disclosed herein.
Figure 5:
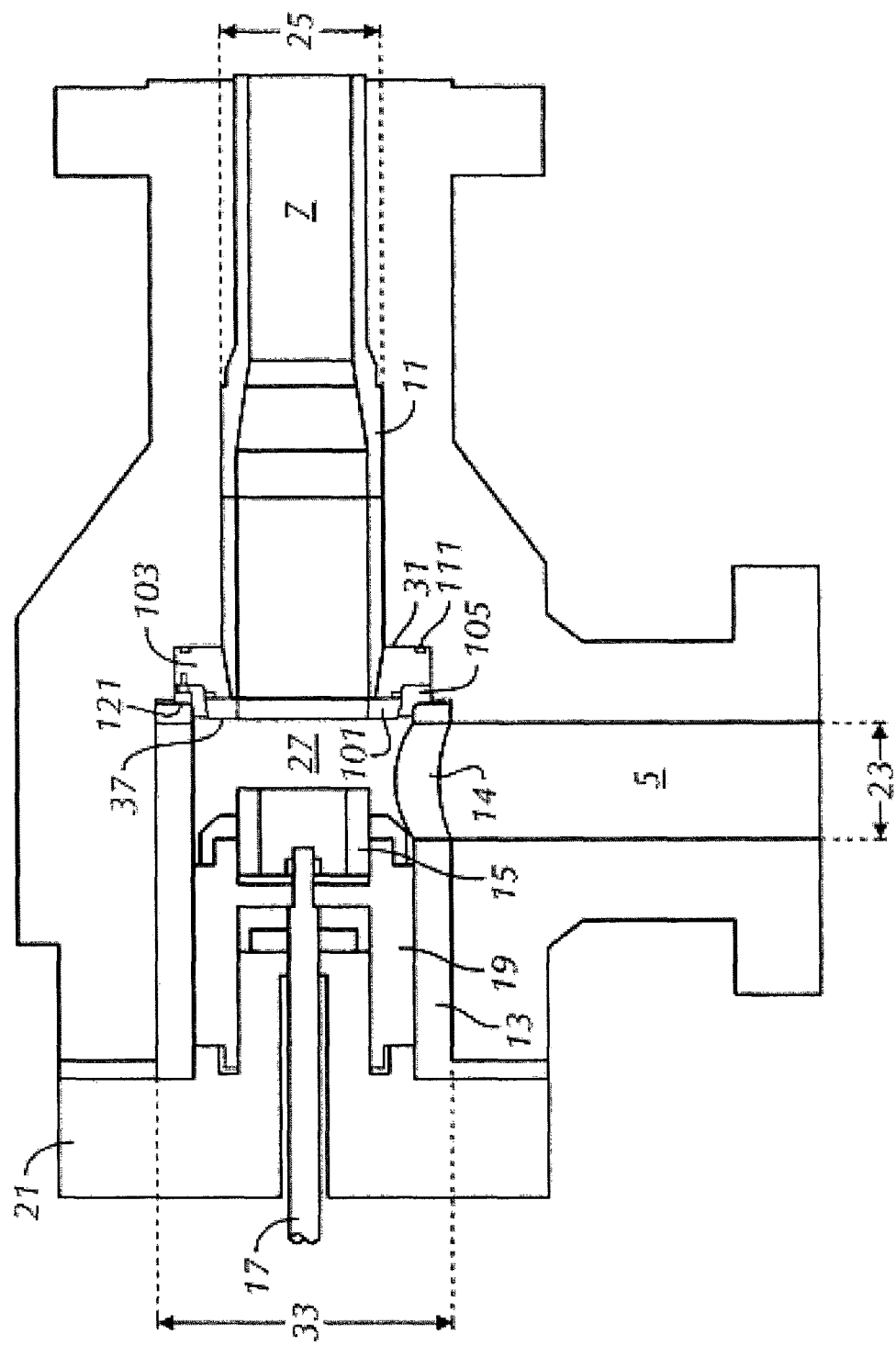
FIG. 5 is a schematic cross-sectional view of a choke valve comprising a choke trim assembly according to embodiments disclosed herein.

FIGS. 4a, 4b, and 5 illustrate another embodiment of the trim assembly disclosed herein, where like numerals represent like parts. In this embodiment, an alternative arrangement for second circumferential groove 119 and fine threaded screw 121 are provided. Additionally, in this embodiment, the shape of the trim 101, the trim carrier 103, and the clamp ring 105 are modified as compared to the embodiment illustrated in FIGS. 2a, 2b, and 3.

Embodiments disclosed herein may further provide one or more of the following advantages. Due to the trim being mechanically locked into place by the trim carrier and the clamp ring, the trim will keep mechanical concentricity with respect to the shuttle and the outlet channel. The trim is retained in a fixed position by the sleeve flange due to the tolerance stacks of the flanges of the trim carrier and the clamp ring. The gap between the outer diameter of the tubular member of the clamp ring and the inner diameter of the flange sleeve is now greatly reduced, the maximum tolerance being around 0.008". The trim assembly and the flange sleeve are aligned based on the same bore, i.e., with respect to the choke orifice. Thus, the shuttle and the trim assembly are also aligned based on the same bore since the shuttle assembly is aligned with the flange sleeve. This prevents the trim assembly and the trim-assembly components from moving and misalignment. Also, the simplified design of the trim-assembly components allows for pressure load from the fluid flowing through the choke valve to be transferred to the choke housing through the trim carrier more easily. Thus, trim breakage or trim assembly breakage can be avoided.

Furthermore, the components of the trim assembly, according to embodiments disclosed herein, enable a simple geometry and no grinded shapes or sharp corners. The cross-sectional areas of the components are changing consistently or less than the cross-sectional area of prior-art trims, thus minimizing fracture points and providing better load transfer to the choke housing. Also, the trim-assembly components may be fabricated easily, which will lead to cost reduction during manufacture.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a choke valve having a flange sleeve;
   a choke trim assembly engaged with the choke valve, the choke trim assembly including:
      a trim;
      a trim carrier; and
      a clamp ring,
         wherein the trim and the trim carrier are disposed within the clamp ring such that the trim, the trim carrier, and the clamp ring are maintained concentric with each other,
         wherein the clamp ring and the trim carrier each have a flange portion, a radial surface of the trim carrier flange portion interfacing with a radial surface of the clamp ring flange portion, and
         wherein a portion of the clamp ring is fitted within the flange sleeve such that the clamp ring and the flange sleeve are maintained concentric with each other; and
   a cylindrical wear sleeve having a bore formed therethrough and a tapered section engaged with a tapered section of a counter bore of the trim carrier, wherein the choke trim assembly further comprises an o-ring disposed between and contacting each of the trim, the trim carrier and the clamp ring for sealing between the trim, the trim carrier, and the clamp ring.

2. The system according to claim 1, wherein the trim is donut shaped.

3. The system according to claim 1, wherein the trim is wedge-locked in the clamp ring.

4. The system according to claim 1, wherein the outer diameter of the trim is tapered.

5. The system according to claim 4, wherein the outer diameter of the trim is tapered at an angle from about 7° to 13°.

6. The system according to claim 1, wherein the trim is made of tungsten carbide.

7. The system according to claim 1, wherein the trim carrier and the clamp ring are made of stainless steel.

8. The system according to claim 1, wherein the choke valve comprises a choke housing, a shuttle assembly disposed in the flange sleeve, and the choke trim assembly for use as a shuttle seat.

9. The system according to claim 8, wherein the choke valve further comprises a second o-ring for sealing between the choke trim assembly and the choke housing.

10. The system according to claim 1, wherein the wear sleeve is tungsten carbide.

11. A system comprising:
    a choke valve having a flange sleeve;
    a choke trim assembly engaged with the choke valve, the choke trim assembly including:
       a trim;
       a trim carrier; and
       a clamp ring,
          wherein the trim and the trim carrier are disposed within the clamp ring such that the trim, the trim carrier, and the clamp ring are maintained concentric with each other,
          wherein the clamp ring and the trim carrier each have a flange portion, a radial surface of the trim carrier flange portion interfacing with a radial surface of the clamp ring flange portion, and wherein a portion of the clamp ring is fitted within the flange sleeve such that the clamp ring and the flange sleeve are maintained concentric with each other; and a cylindrical wear sleeve having a bore formed therethrough and a tapered section engaged with a tapered section of a counter bore of the trim carrier wherein the choke trim assembly further comprises an o-ring disposed between and contacting each of the trim, the trim carrier and the clamp ring for sealing between the trim, the trim carrier, and the clamp ring, and further wherein the o-ring is adapted to be seated in a first circumferential groove of a second flange of the trim carrier.

12. A system comprising:

a choke valve having a flange sleeve;

a choke trim assembly engaged with the choke valve, the choke trim assembly including:

a trim;

a trim carrier; and a clamp ring, wherein the trim and the trim carrier are disposed within the clamp ring such that the trim, the trim carrier, and the clamp ring are maintained concentric with each other, wherein the clamp ring and the trim carrier each have a flange portion, a radial surface of the trim carrier flange portion interfacing with a radial surface of the clamp ring flange portion, and wherein a portion of the clamp ring is fitted within the flange sleeve such that the clamp ring and the flange sleeve are maintained concentric with each other; and a cylindrical wear sleeve having a bore formed therethrough and a tapered section engaged with a tapered section of a counter bore of the trim carrier, the choke valve comprises a choke housing, a shuttle assembly disposed in the flange sleeve, and the choke trim assembly for use as a shuttle seat, the choke valve further comprises an o-ring for sealing between the choke trim assembly and the choke housing and further wherein the o-ring is adapted to be seated in a circumferential groove of the trim carrier flange portion.

* * * * *